Nov. 21, 1967  K. E. MEISSNER  3,353,860
DRUPE GRIPPING DEVICE
Filed Jan. 4, 1966  3 Sheets-Sheet 1
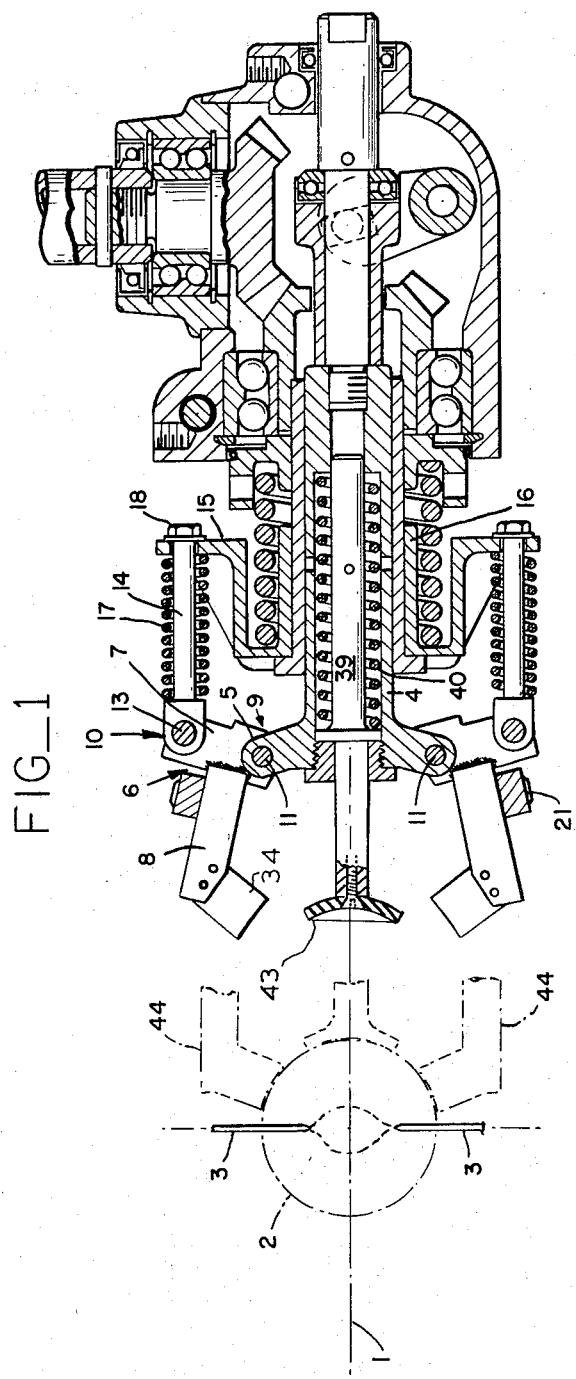
INVENTOR.
KONRAD E. MEISSNER
BY
Boyken, Mohler, Foster
and Schlemmer
ATTORNEYS Nov. 21, 1967 K. E. MEISSNER 3,353,860
DRUPE GRIPPING DEVICE
Filed Jan. 4, 1966 3 Sheets-Sheet 2
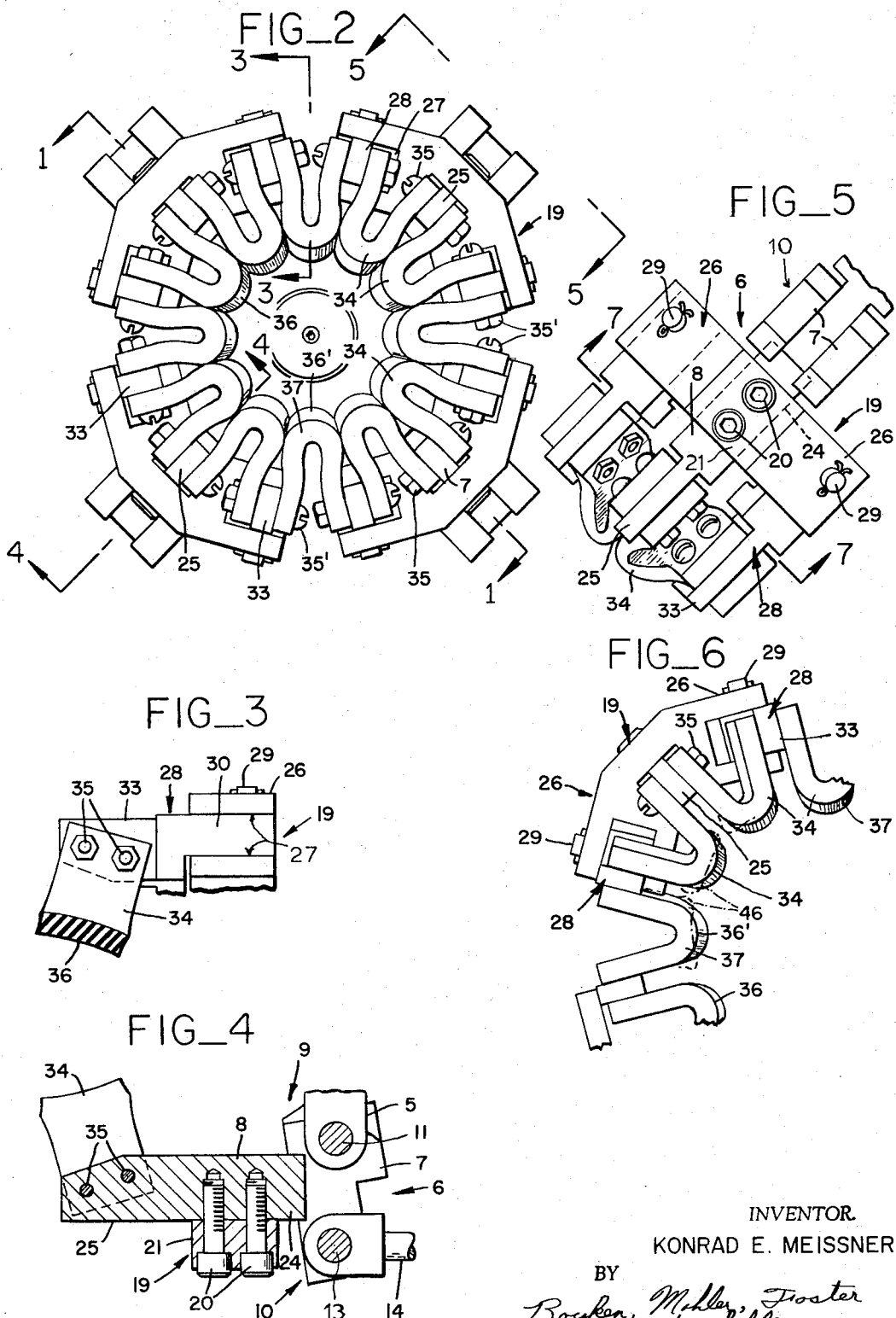
INVENTOR.
KONRAD E. MEISSNER
BY
Boyken, Mohler, Foster
and Schlemmer
ATTORNEYS

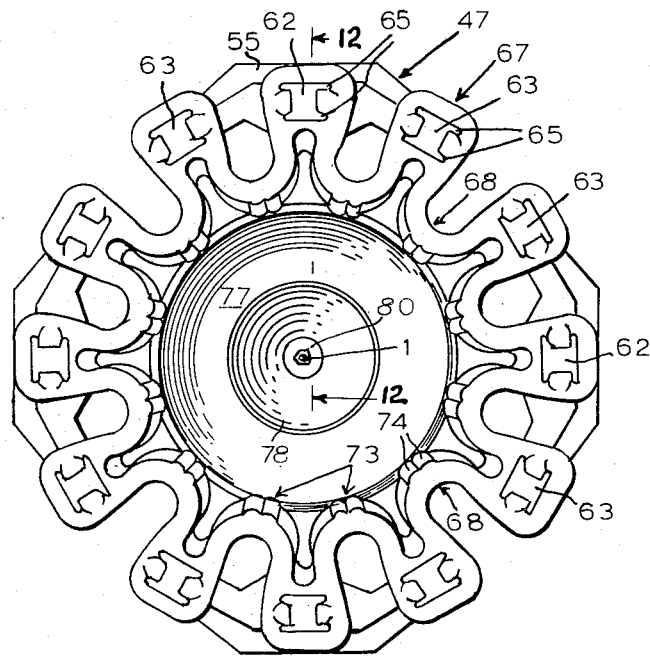
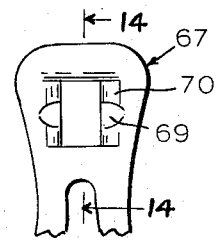
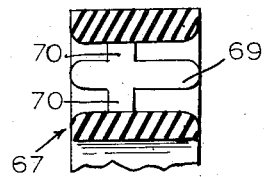
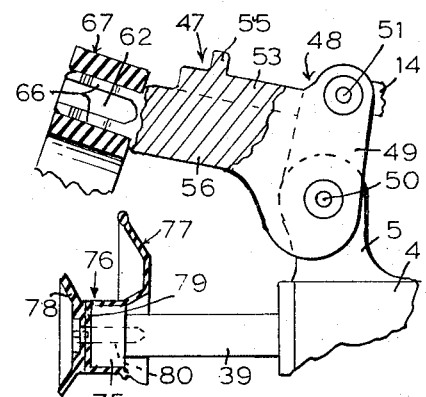
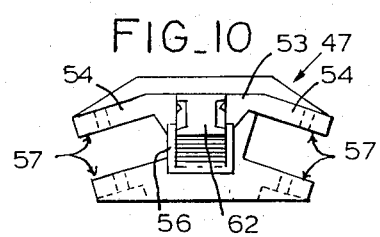

United States Patent Office 3,353,860
Patented Nov. 21, 1967

3,353,860
DRUPE GRIPPING DEVICE
Konrad E. Meissner, Alameda, Calif., assignor to Filper Corporation, San Ramon, Calif., a corporation of California
Filed Jan. 4, 1966, Ser. No. 518,606
7 Claims. (Cl. 294—100)

ABSTRACT OF THE DISCLOSURE

Drupe grippers providing an annular row of drupe engaging fingers adapted to frictionally grip the spherical outer surface of a generally spherical drupe at one side of a plane bisecting the drupe and perpendicular to the axis of said row for separating the pit from the drupe upon effecting relative movement about said axis between the pit and the body of the drupe attached to said pit.

---

This invention relates to improvements in the drupe gripping means in a pitter of the type shown in United States Letters Patent No. 2,826,227, issued Mar. 11, 1958, to Joseph Perrelli et al.

Fruit pitters, such as shown in the aforesaid patent, are widely known in the fruit canning industry as "torque" or "Filper" pitters, in which the pit of a clingstone peach, for example, is gripped and held, and at the same time the body of the peach that is adhered to the pit is gripped separately from the pit. Relative rotation of the pit and body, or of the gripping means respectively gripping the pit and body, will then result in separating the pit from the body. The body itself is normally bisected to the pit before such relative movement so that the body gripped by one of the body-gripping means is one half the body. Whether both halves of the body are separately gripped by a body-gripping means and the relative movement between them and the pit is simultaneous, or whether the body halves are successively separated, is immaterial insofar as this invention is concerned, the important thing being that the body-gripping means will tightly grip different sized body halves without injury to the fruit.

Clingstone peaches for canning are normally relatively hard, and to engage the hemispherical outer surface of a peach half with sufficient pressure to cleanly break the fibrous connection at the pit cavity between each half and the pit by relative rotation between the pit and the body half, requires substantial pressure. If there is slippage between the body-gripping means and the fruit half, the latter is injured, and since peaches vary from each other in both size and external contour, the body gripping means must be capable of automatically adjusting itself to the peaches without sacrifice in force or without injury to the fruit.

Heretofore various attempts to accomplish the above results have been made varying from the use of contractable nooses to generally conical shaped cups. The employment of "fingers" or separate gripping elements movable generally radially into and out of engagement with fruit halves, as shown in the above-designated patent, while successful, may under certain circumstances injure some peaches or slippage may occur.

One of the objects of this invention is the provision of fruit gripping means for use in a torque pitter that will overcome the likelihood of slippage on the fruit and injury thereto.

Another object of the invention is the provision of fruit gripping means in a torque pitter that is adapted to firmly grip fruit halves of different sizes and textures and to rotate them relative to the pit adhered thereto, without injury to the fruit halves.

Other objects and advantages will appear in the description and drawings.

In the drawings, FIG. 1 is a vertical cross sectional view through the peach gripping and twisting mechanism for gripping and twisting one of the peach halves relative to the pit, the peach engaging and twisting portion being taken along line 1—1 of FIG. 2 for showing its connection with the means for contracting and expanding said portion.

FIG. 2 is an enlarged end elevational view of the peach gripping portion only of FIG. 1, as seen from the left side of FIG. 1, but showing the gripping means as being contracted.

FIG. 3 is a fragmentary cross sectional view at line 3—3 of FIG. 2.

FIG. 4 is a fragmentary cross sectional view at line 4—4 of FIG. 2.

FIG. 5 is a fragmentary elevational view of a part of the peach gripping means as seen from line 5—5 of FIG. 2.

FIG. 6 is a fragmentary end elevational view of a portion of the peach gripping part of FIG. 2 in expanded position.

FIG. 7 is a cross sectional view taken along line 7—7 of FIG. 5.

FIG. 8 is an end elevational view of a modification of the structure shown in FIG. 1, in which the device is partially expanded.

FIG. 9 is a plan view of one of the four units for supporting a section of the annular peach engaging means, separate from the latter.

FIG. 10 is an outer end elevational view of the unit of FIG. 9 exclusive of the two fingers pivotally connected thereto at opposite sides of the rigid central finger shown in FIG. 9.

FIG. 11 is a side elevational view of one of the pair of fingers pivotally connected to the support of FIG. 9.

FIG. 12 is a cross sectional view taken substantially along line 12—12 of FIG. 8 but shown partially in elevation.

FIG. 13 is an enlarged end elevational view of one of the peach or drupe engaging elements, separate from the holder.

FIG. 14 is a cross sectional view taken along line 14—14 of FIG. 13.

The mechanism for actuating each of the peach gripping devices herein shown is substantially identical with that shown and described in the aforesaid Patent No. 2,826,227. In said patent each of the peach gripping means for gripping each half of a peach comprises four separate peach gripping elements equally spaced from each other about a central axis of rotation about which the elements are adapted to be simultaneously revolved when the latter engage a fruit half, and means is provided for simultaneously moving said elements into and out of gripping engagement with the convex outer surface of a peach half.

The peach gripping means for gripping opposite halves of a peach at opposite sides of a pit therein is the same, and the actuating means for each of the peach gripping means is the same, hence, a showing of one such peach gripping and actuating means is adequate for both. Also, in the present instance, the novelty resides in the peach gripping means, since the same means for moving the peach gripping means into and out of engagement with the halves of a peach, and for rotating the peach gripping means to twist the halves from the pit, is shown and described in the aforesaid patent. In each instance the pit is held stationary as the halves are rotated.

The central axis of rotation of the peach engaging and gripping means is indicated at 1 (FIG. 1), which axis extends substantially centrally through the peach that is gripped. The outline of a peach is indicated in dot-dash line 2, and the pit within the peach is adapted to be firmly held between coplanar blades 3 that, in turn, bisect the peach to the pit, which arrangement is old, as shown and described in the aforesaid patent.

The conventional actuating means for the peach engaging means of this invention includes a hollow shaft 4 that is coaxial with axis 1, the outer end of which shaft is provided with four equally radially outwardly projecting lugs 5. The "outer" end of shaft 4 is the left hand end as viewed in FIG. 1, and the end opposite thereto is the inner end.

A crank, generally designated 6 is provided for connection with each lug 5, and each crank includes a pair of corresponding arms 7, each integrally connected adjacent to one of their ends with one end of a laterally projecting arm 8 that spaces arms 7 to provide a clevis, generally designated 9, at one end of each pair thereof, and a clevis generally designated 10 at the opposite end of each pair of arms. Each clevis 9 straddles one of the lugs 5 and is pivotally connected thereto by a pivot 11. The clevis 10 at the outer end of each arm 7 is pivotally connected by a pivot 13 with one end of a rod 14 (FIG. 1) that extends between the sides of said clevis 10. Rod 14 extends substantially parallel with axis 1 through an opening in a radially outwardly projecting flange 15 on a sleeve 16, which sleeve, in turn, encloses and is coaxial with shaft 4. Sleeve 16 and shaft 4 are reciprocable, relative to each other.

A coil spring 17 around each rod 14 reacts between flange 15 and a shoulder on each rod, each of which shoulders is adjacent pivot 13 to yieldably maintain a nut 18 on the end of each rod 14 that extends through flange 15 against said flange.

The foregoing structure has its counterpart in the aforesaid patent, in which provision is made for moving the sleeve 16 and tubular shaft 4 relatively so that the outer ends of arms 8 will swing in directions toward and away from axis 1 in peach clamping and releasing operations. The shaft 4 and sleeve are adapted to rotate to move the cranks 6 about axis 1 in a peach twisting operation.

The present invention is particularly concerned with the peach engaging and gripping means on the outer ends of arms 8, and their action upon pivotal movement of the cranks about pivots 11 and 13.

An elongated saddle-like member, generally designated 19 (FIGS. 2, 5–7), extends transversely across the radially outwardly facing surface of each arm 8, and is centrally secured to each arm 8 by bolts or machine screws 20 (FIGS. 4, 5, 7). The radially inwardly facing side of the central portion 21 of each saddle 19 (relative to axis 1), is formed with a rectangular radially inwardly opening groove 22 (FIG. 7) extending transversely relative to the length of saddle 19, in which groove is seated the inner end portion 24 of arm 8. This inner end portion 24 of each arm may be approximately square in cross sectional contour, and the opposite or outer end portion 25 projects generally horizontally outwardly of the saddle in a direction away from arms 7. The outwardly projecting portions 25 are of less width, laterally, than the portions 24 so that portions 25 are oblong in cross sectional contour with their greatest dimension disposed radially relative to axis 1.

Saddle member 19 has opposite end portions 26 at opposite sides of groove or recess 22. Each of these end portions is the same, and each is formed with a recess 27 that opens laterally outwardly of saddle member 19 to form end grooves or recesses at the ends of the saddle member. Said end portions 26 are angularly disposed relative to the central portion 21 in which the inner groove 22 is formed, and when all of the cranks 6 are pivotally connected to lugs 5 and rods 14, the central portions 21 will be substantially tangential to a circle that is concentric with axis 1, and the end portions 26 will extend approximately normal to radii from said axis, as will each central portion 21 (FIGS. 2, 6). Thus portions 21 and 26 of the saddle members may be said to be circumferentially disposed relative to a circle coaxial with axis 1, and said saddle members are equally spaced apart and are adapted to move radially inwardly and outwardly about axis 1 upon the cranks 6 being pivoted about pivots 11.

Supported within each of the recesses or grooves 27 in the portions 26 of each saddle member is a relative short arm 28 that substantially coerrsponds in cross sectional contour and shape to each arm 8 except that the inner end of each arm 28 terminates at the side of each saddle member 19 opposite that from which portions 25 of arms 8 project.

A pivot pin 29 extends radially relative to axis 1 through the upper and lower walls of each recess 27 (FIG. 7) and pivotally supports each arm 28 for swinging or rocking about the axis of each pin.

Arms 28, as seen in FIG. 7, may be substantially square in cross sectional contour at their inner end portions 30 where they extend into the grooves or recesses 27. The outer end portions 33 that project outwardly of portions 26 of the saddle members are of substantially the same cross sectional contour as that of each portion 25 of each arm 8. The relation between each end portion 30 and the recess in which it is positioned is such as to enable the arms 30 to swing about the axis of each pivot 29.

As viewed in FIGS. 2, 6, the outer end portions 25 and 33 of arms 8, 28 are disposed in substantially an annular row coaxial with axis 1, and are approximately equally spaced from each other in said row with pairs of adjacent pivotally supported arms 28 alternating with stationary arms 8, and which arms 28, 8 are supported for radially inward and outward movement relative to axis 1 about pivots 11, while the said pairs of adjacent pivotally supported arms 28, in addition, are swingable about axes extending generally radially relative to axis 1.

Relatively thick flexible straps 34 of resilient rubber or rubber like material are each secured at one end thereof by bolts 35 against one of the lateral sides of each projection 25 of each arm 8. These bolts extend through the end of each strap and each projection 25. The other end of each strap 34 is secured by bolts 35' (FIG. 2) against the side of each end portion 33 of each arm 28 that is adjacent to each projection 25. By this structure each strap 34 is bowed on itself to generally U-shape with the spacing between the legs varying upon movement toward and away from each other.

The bowed straps 34 project generally radially inwardly toward axis 1 to provide convexley curved generally radially inwardly facing surfaces 36 (FIGS. 2, 6) that are in an annular row, the convex curvature being in the direction of the length of each strap. The cross-sectional curvature of surface 36 in a direction transversely of each strap will be slightly concave (FIG. 3) and naturally occurs upon bowing each strap to generally U-shape, since the straps are relatively thick and the arc at the closed end of the U-shape is relatively sharp. As an example, the thickness of each strap may be approximately one-third of the diameter of surface 36.

The adjacent saddle members 19 are connected by straps 37 that correspond to straps 34, each strap 37 having its end portions secured against the spaced opposed faces of the adjacent projections 33 that are at the adjacent ends of adjacent pairs of saddles 19 by bolts 35' that also secure one of the ends of each strap 34 to each projection 33.

The convex radially inwardly facing surfaces of straps 37 are in the same annular row of the surfaces 36 of straps 34, and said surfaces on straps 37 may be designated 36'.

The angular relationship of straps 34, 37 relative to axis 1 and to the projecting portions 25, 33 of arms 8, 28, is such that the surfaces 36, 36' of the U-shaped straps 34, 37 will substantially follow and conform to the generally spherical outer surface contour of peaches adjacent to the plane of the division between the peach halves, in a direction transversely of each strap, and which plane is substantially coincidental with the suture of each peach.

The convex curvatures of the generally radially inwardly facing surfaces of the closed ends of the U formed by each strap extends transversely of the circular row of such surfaces, and transversely to the direction of rotation of said row in a twisting operation, hence will resist slippage relative to the peach that is engaged therewith.

Straps 34, 37 are adapted to expand upon cranks 6 being actuated to swing the outer ends of arms 8 outwardly relative to axis 1, and when so expanded, the peach engaging surfaces 36 of said straps will also move radially outwardly, both to enable said surfaces to engage larger peaches and to free peach halves that have been twisted from their pits.

In the mechanism shown in FIG. 1 a central plunger 39 is spring urged axially outwardly of the hollow shaft 4 by a coil spring 40. The outer end of the plunger includes a cap 43 of rubber or the like that is adapted to engage the central portion of each peach on axis 1 when each mechanism is moved from the full line position in which the peach engaging surfaces of straps 34, 37 move radially inwardly to dot-dash line positions 44 (FIG. 1) in engagement with a peach half. When said straps are in positions 44, the plunger will be under tension of spring 40, and when the straps 34, 37 are expanded and the mechanism carrying them move back toward the full line position in FIG. 1, the plunger 39 will automatically force each peach half away from the straps 34, 37. Thus the plunger in the present instance functions as an ejector for the peach half in addition to its function of urging each peach half centrally against a held or stationary pit during the twisting of the halves from the pit. The plunger 39 is not new, since it also is part of the disclosure in the patent hereinbefore mentioned.

In operation, when the mechanism of FIG. 1 is moved toward a peach, the cranks 6 will be actuated to move the saddle members 19 radially inwardly as soon as the surfaces 36, 36' are in a position for engaging the peach half along a circular line coaxial with axis 1 and adjacent to the plane of the suture of the peach. The convex surfaces 36, 36' of the straps will then engage the convex surface of each half along said suture. These convex surfaces of straps 36, 36' may slightly flatten if the pressure of the straps against a peach is sufficient, as generally indicated in dot-dash lines 46 in FIG. 6. It is to be understood that the degree of hardness and flexibility of the straps 34, 37 is preferably such that upon the peach halves being engaged thereby, there will be substantially no lag in the twisting of the peach halves upon rotary movement of the annular row of U-shaped fingers provided by straps 34, 37, due to either the flexibility of the fingers or their texture.

It is to be understood that the present invention is not to be construed as being limited to any precise number of fingers or peach engaging surfaces, or to dimensions. However, in the example shown herein and with a mechanism of the same dimensions as shown in the aforesaid Patent No. 2,826,227 or in U.S. Patent No. 3,179,137 of George E. Kilner, issued April 20, 1965, provision is made for twelve, substantially equally spaced and relatively movable peach engaging fingers, instead of four, with a correspondingly greater gripping efficiency with no increase in the degree of force applied. Nor is there any increase in the number of arms for swinging the saddle members.

The pivotal mounting of arms 28 permits the expansion of the U-shaped fingers upon radially outward movement thereof, and the contracting of the fingers upon radially inward movement so that the fingers of the row, and the spacing between the gripping surfaces will remain approximately the same at all times, and also the manner in which the fingers are supported enables the fingers to adapt themselves to irregularities in the outer contours of the peaches without injury to the latter.

It is desirable that each peach half, irrespective of size, be gripped relatively close to the plane of its suture, or to the plane of the division of the body.

Each of the surfaces 36, 36' may be provided with a plurality of ribs, extending transversely of each strap, and having convexly curved outer surfaces, if desired, and it is also pertinent to note that the straps or fingers 34, 37 may be pre-molded, preferably generally to the expanded shape as seen in FIG. 6 whereby natural expansion will occur upon radial outward movement of the fingers.

In brief, the present invention, as above described, provides for an annular row of peach gripping fingers having generally radially inwardly facing peach gripping surfaces, relative to the central axis of the row, and means connecting the fingers of said row, which means includes portions of each of said fingers substantially uniformly expandable circumferentially upon radially outward movement of said fingers relative to the axis of the row, and substantially uniformly contractible upon radially inward movement of said fingers for maintaining said fingers substantially equally spaced apart during said radially outward and said radially inward movement.

It is also pertinent to not that by the structure as described the fingers of the row are in groups of a uniform number of relatively movable fingers with a single means supporting each group for movement thereof as a unit toward and away from the axis of the row, as distinguished from a single finger at each point and a single means supporting each finger for radially inward and outward movement.

In the modification as shown in FIGS. 8–14, the operating mechanism for contracting and expanding the drupe or peach engaging means is the same as shown in FIG. 1. The modification is in the saddle-like members and supports for the drupe or peach gripping and engaging means, and in the drupe engaging means, together with an addition on the central plunger 39. The same numbers will be used on elements shown in FIGS. 8, 9 and 12 that have counterparts in FIGS. 1–7.

The manner of operation of the peach gripping means of FIGS. 8–14 is substantially the same as the means shown in FIGS. 1–7, but the structure in FIGS. 8–14 is simplified and improved. For example, the saddle-like member generally designated 47 (FIGS. 8–10, 12) is cast in one piece, the same member being used as in FIG. 1, each having a crank portion 48 that corresponds in function to crank portion 6 of FIGS. 1, 4, and which crank portion 48 includes a leg 49 that is divided to provide a clevis at each end of each leg portion for respectively receiving a lug 5 on the shaft 4 and the end of one of the rods 14 of the actuating mechanism of FIG. 1. Pivots 50, 51 respectively connect each lug 5 and the end of one of the rods 14 with each leg 49 (FIG. 12).

The other leg of crank portion 48 is generally designated 53 (FIG. 12) and is integrally cast with the saddle-like portion of member 47, which member includes a central section 53 and laterally projecting opposite end portions 54 (FIG. 9) that correspond in position and function to central portion 21 and lateral end portions 26 of member 19 shown in FIG. 5.

A reinforcing rib 55 (FIG. 9) is integrally cast on each member 47, extending across the radially outwardly facing surfaces of central section 53 and end portions 54, and the radially inwardly facing side of the central part 53 has cast therewith a solid thickened portion 56 (FIG. 10) that substantially corresponds to the inner end portion 24 of arm 8 shown in FIG. 7.

The opposite ends 54 of member 47 substantially correspond to the opposite end portions 26 of the saddle-like member 19 of FIG. 7, each end portion being formed with oppositely outwardly opening recesses 57 (FIG. 10) that function to receive the inner ends of a pair of arms, generally designated 60, in the same manner as recesses 27 receive the inner ends of arms 28. Said inner ends of arms 60 are pivotally supported in said recesses by pivots 61 that substantially correspond to pivots 29 of FIG. 7.

The thickened part 56 of the central section 53 is formed with a projection 62 (FIG. 9) that projects outwardly of the forward side of said saddle member 47, and each of the arms 60 has a projection 63 that projects outwardly of the forward side of said member 47.

Each projection 62 and 63 slants radially outwardly relative to the central axis of rotation 1 of the members 47 upon actuation of the mechanism for rotating said members 47.

The oppositely outwardly facing sides of each of the projections 62, 63 is formed with a pair of spaced, parallel ribs 65 extending longitudinally of each projection. Each such rib is formed with a notch 66.

By the foregoing structure it is seen that the central projection 62 on each saddle member 47 is rigid with the latter, while the projections 63 on each member 47 may swing about the axes of pivots 61, toward and away from the projection 62.

The drupe or peach engaging means in the present structure comprises a circular row of generally rectangular sleeves 67 adapted to be releasably held on the projections 62, 63, with the said projections extending into the central passageway in each sleeve, and which sleeves are integrally connected by U-shaped elements 68 that generally correspond to the straps 34 of FIG. 2.

The sleeves and their connecitng elements 68 are of resilient elastic, relatively soft rubber or rubber-like material, and they are molded to form a single unit. The sleeves and connecting portions 68 may be disposed in a single plane perpendicular to the axes of the passageways, so that the latter all extend in the same direction. The material being flexible and elastic, the sleeves 67 may each be drawn over one of the fingers or projections 62, 63 carried by the saddle-like supports or members 67.

The inner opposite sides of each sleeve 67 are each formed with a rib 69 (FIG. 14) that is adapted to extend into the space between the ribs 65 on projections 62 and ribs 65 on projections 63 while ridges 70, extending at right angles to ribs 69, may extend into notches 66. In this manner the sleeves 67 are firmly held on projections 62, 63 and the U-shaped connections 68 will be supported so that their convexly curved drupe or peach engaging surfaces, generally designated 73 (FIG. 8) will substantially follow the annular contour of a cone for following and engaging the convex surface contour of all sides of the half of a drupe along the edges of the cut face of each half in the same manner as straps 34, 37 engage the fruit as seen in FIG. 1. These U-shaped portions 68 may be called "fingers" and in both of the forms illustrated, the fingers are yieldably connected to form an annular row for yieldable movement toward and away from each other circumferentially of the row.

In the form shown in FIG. 8, the drupe engaging surface of each U-shaped portion 68 is formed with a pair of ribs 74 extending transversely across each portion 68 to engage the fruit. These ribs 74 assure against possible slippage of the surfaces 73 relative to the fruit when the group of fruit engaging portions of FIG. 8 are rotated about axis 1 to twist the fruit halves from the pits.

The structure of FIGS. 8–14 has advantages over the structure shown in FIGS. 1–7 in the simplicity of parts and the ease of assembly, disassembly and replacement of parts. Also greater uniformity is insured by reason of the drupe engaging portions being absolutely uniform as to their characteristics, structures and positions.

The relative movement between the fingers circumferentially of the row, in both forms of the invention, enables automatic adjustment of the fingers according to the contour of the outer surface of the drupe that is to be gripped, and the occurrence that the contact points between the fingers and the drupe are substantially equally spaced apart irrespective of the size of the drupe, and almost form a continuous contact in the case of small drupes, is present in both forms of the invention. Also, in both forms the fingers themselves are adapted to flex independently of each other and their supports for movement of the peach engaging surface of each finger generally radially of the drupe or peach that is gripped. All of the above features contribute to providing a far more positive engagement between the fruit and the gripping means than heretofore, while eliminating possible injury to the body of the drupe.

In FIG. 12 it is seen that the spring urged central plunger 39 is provided with an enlarged end member 75 that is adapted to be received in a central cap portion 76 of a circular shell 77 extending radially outwardly of the cap portion 76. A circular disc 78 is secured against the outer surface of the head 79 of cap portion 76 by a screw 80. This disc 78 is dished in cross sectional contour with the convex or recessed side facing outwardly of the outer end of plunger 39, it being considered that enlargement 75 is part of the plunger. Disc 78 functions in substantially the same manner as disc 43 in FIG. 1, while the shield 77 may function to exclude any portion of a peach or drupe half from being deposited in the apparatus at the rear side of the shield. In this connection it is pertinent to note that the plunger 39 also functions as an ejector, being moved inwardly into the hollow shaft 4 when it engages the fruit, and when the fingers 68 move into drupe engaging relation as indicated in FIG. 1 for fingers 34.

While specific embodiments of the present invention have been shown and described, it is to be understood that the gripping means so shown and described is capable of modification and variation without departing from the spirit of the invention and the scope of the invention should be limited only by the scope of the claims appended hereto.

I claim:
1. Drupe gripping means for tightly gripping the convex outer surface of a peach and the like around the latter adjacent to one side of a plane bisecting said peach for twisting one half of the body thereof from the pit therein, comprising:
 (a) an annular row of adjacent pairs of peach gripping fingers generally facing the axis of said row and supported for generally radially inward movement from expanded positions outwardly of a peach adapted to be positioned on said axis and projecting into the area encircled by said row, to a contracted position in engagement with the convex surface of said peach adjacent to said one side of said plane;
 (b) supporting means supporting adjacent pairs of said fingers at equally spaced points around said row for said generally radially inward movement and for movement of fingers of said adjacent pairs relative to each other;
 (c) connecting means connecting the fingers of said adjacent pairs for uniformly spacing said fingers from each other during said radially inward movement;
 (d) each of said fingers being generally U-shape and of resilient, rubber-like material providing a closed end portion and a pair of spaced opposed leg portions;
 (e) said connecting means being respectively connected with one of the leg portions of each adjacent pair of fingers and the closed end portion of each finger being disposed radially innermost relative to said axis of said row.

2. In drupe gripping means as defined in claim 1:
 (d) said supporting means comprising a plurality of corresponding cranks each having a pair of arms extending angularly relative to each other;
 (e) means pivotally supporting said cranks adjacent to the junctures between the arms of each crank in positions equally spaced around said axis for movement of the outer ends of one of the arms of each crank in directions generally radially inwardly and outwardly relative to said axis;

(f) a supporting member on each of said outer ends supporting a plurality of different fingers of said row for movement therewith in directions radially inwardly and outwardly relatvie to said axis.

3. In drupe gripping means as defined in claim 2:

(g) means supporting at least one of the fingers on each supporting member for movement relative to said member.

4. In drupe gripping means as defined in claim 1:

(d) the said fingers of said row being in groups providing a plurality of adjacent pairs of said groups, and said supporting means including separate finger supporting members in an annular row coaxial with said row of fingers each connected with the fingers of a group thereof;

(e) one of the fingers of each group being circumferentially expandable and contractible relative to said annular row thereof and being connected with the finger supporting member adjacent thereto for circumferential movement of said finger supporting members in the row thereof relative to each other upon movement of said fingers radially inwardly and outwardly.

5. In drupe gripping means as defined in claim 1:

(d) said supporting means including a plurality of saddle-like members each having a central portion and two end portions extending oppositely outwardly therefrom, said central and each of said end portions being disposed generally tangentially of a circle coaxial with said row;

(e) a central projection rigid on said central portion extending generally axially and radially outwardly of said row from one side of said central portion, and a projection on each of said end portions corresponding to said one side of said central portion;

(f) said central projection and said projections on each of said end portions being disposed in an annular row outwardly of and coaxial with said row of fingers;

(g) means supporting the projections on said end portions for oscillatory movement generally circumferentially of the circular row in which they are positioned;

(h) said fingers each being of resilient, flexible material and of generally U-shape providing a pair of opposed sidewalls and an arcuately curved outer end wall connecting one of the corresponding ends of each with each of such end walls having a convexly curved outer surface adapted to engage the outer surface of a drupe with said sidewalls extending generally radially outwardly away from such drupe relative to the center of the latter;

(i) means releasably supported on each of the projections in said annular row thereof integrally connected with one of the sidewalls of each adjacent pair of fingers whereby the sidewalls of each finger will be adapted to move toward and away from each other and whereby the adjacent fingers of said row will be adapted to move toward and away from each other upon movement of said saddle-like members radially inwardly and outwardly relative to the central axis of said row of fingers; and, (j) means supporting said saddle-like members for movement toward and away from said axis.

6. Drupe gripping means for tightly gripping the convex outer surface of a peach and the like around the latter adjacent to one side of a plane bisecting said peach for twisting one half of the body thereof from the pit therein, comprising:

(a) an annular row of adjacent pairs of peach gripping fingers generally facing the axis of said row and supported for generally radially inward movement from expanded positions outwardly of a peach adapted to be positioned on said axis and projecting into the area encircled by said row, to a contracted position in engagement with the convex surface of said peach adjacent to said one side of said plane;

(b) supporting means supporting adjacent pairs of said fingers at equally spaced points around said row for said generally radially inward movement and for movement of fingers of said adjacent pairs relative to each other;

(c) connecting means connecting the fingers of said adjacent pairs, for uniformly spacing said fingers from each other during said radially inward movement;

(d) said fingers each being of resilient, flexible material and of generally U-shape providing a pair of spaced opposed opposite side walls and an arcuately curved outer end wall connecting one of the corresponding ends of each pair of sidewalls with each of such end walls having a convexly curved outer surface adapted to engage the outer surface of such drupe with said sidewalls extending away from said drupe whereby the said sidewalls are adapted to flex oppositely outwardly upon force being applied to said fingers in a direction away from such drupe at the ends of said sidewalls that are remote from said end wall;

(e) said connecting means being integral with one of the sidewalls of each adjacent pair of fingers and connecting with the ends of said sidewalls that are remote from said end wall.

7. In drupe gripping means as defined in claim 6:

(f) said connecting means each being hollow and said supporting means including members releasably held within each of said connecting means.

References Cited

UNITED STATES PATENTS 3,179,137   4/1965   Kilner _____ 146—28

GERALD M. FORLENZA, *Primary Examiner.*

G. F. ABRAHAM, *Assistant Examiner.*